United States Patent
Russell et al.

(10) Patent No.: US 6,902,194 B2
(45) Date of Patent: Jun. 7, 2005

(54) DETACHABLE INTERLOCKING SEAT BELT ANCHORAGE APPARATUS AND METHOD

(75) Inventors: Jeff A. Russell, Richmond, MI (US); Steven J. Combs, Chesterfield Township, MI (US); Kevin J. Dewey, Shelby Township, MI (US); David B. Figlioli, Clinton Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 162 days.

(21) Appl. No.: 10/354,857

(22) Filed: Jan. 30, 2003

(65) Prior Publication Data

US 2004/0150212 A1 Aug. 5, 2004

(51) Int. Cl.[7] .......................... B60R 22/00; B60R 22/48
(52) U.S. Cl. ..................... 280/801.1; 280/808
(58) Field of Search ............................. 280/801.1, 808; 24/630, 632, 633, 637; 297/481, 483, 485

(56) References Cited

U.S. PATENT DOCUMENTS

| | | | |
|---|---|---|---|
| 3,233,296 A | * | 2/1966 | Whittingham ........... 242/381.3 |
| 3,680,914 A | | 8/1972 | Stephenson et al. |
| 3,790,209 A | | 2/1974 | Littman |
| 4,702,491 A | | 10/1987 | Meyer |
| 4,915,413 A | | 4/1990 | Meyer |
| 5,403,038 A | | 4/1995 | McFalls |
| 6,116,696 A | | 9/2000 | Widman et al. |
| 6,334,628 B1 | * | 1/2002 | Newball et al. ......... 280/801.1 |
| 6,338,502 B1 | | 1/2002 | Czank |
| 6,711,790 B2 | * | 3/2004 | Pontaoe ....................... 24/633 |

* cited by examiner

Primary Examiner—Paul N. Dickson
Assistant Examiner—Laura B. Rosenberg
(74) Attorney, Agent, or Firm—Sally J. Brown

(57) ABSTRACT

A detachable three point seat belt assembly is provided. The seat belt assembly may have a belt extending downward along a seat from a retractor. In an anchored configuration, the distal end of the belt is attached to a static attachment feature by an interlocking buckle. A movable attachment feature coupled to the belt is engaged within a static buckle to buckle a vehicle occupant into the seat. In a free configuration, the interlocking buckle is disengaged from the static attachment feature so that the belt can be retracted along the seat. The interlocking buckle contains a latching lever and a pair of ejectors that operate in such a manner that insertion of the movable attachment feature enables withdrawal of the static attachment feature, and vice versa.

35 Claims, 7 Drawing Sheets

DETACHABLE INTERLOCKING SEAT BELT ANCHORAGE APPARATUS AND METHOD

BACKGROUND OF THE INVENTION

1. Field of the Invention

The present invention relates to systems and methods for protecting vehicle occupants from injury. More specifically, the present invention relates to a detachable anchoring apparatus and method for a seat belt.

2. Description of Related Art

Seat belts have been instrumental in saving many thousands of lives in automobile accidents. Statistics consistently attest to the effectiveness of seat belts in reducing occupant injury. Seat belts are typically attached to automobile seats or to the interior of the automobile, adjacent to the seat. The invention of the three point safety harness, i.e., a lap belt used in conjunction with a shoulder harness, enhanced the life-saving effect of automotive seat belts.

Unfortunately, traditional seat belt anchoring schemes have a number of limitations. For example, many larger automobiles, such as vans and SUV's, have foldable or removable seating. As a result, passenger space inside the vehicle can be used to hold passengers or bulky items. Unfortunately, known anchoring systems for three point safety harnesses often inhibit the design and operation of such reconfigurable seating configurations. More precisely, the shoulder harness is often anchored to the seat and to an overhead space within the vehicle. In order to move the seat, the shoulder harness must in some way be detached.

Furthermore, many three point safety harness systems are not conveniently usable with center seats in a bench seating arrangement. If a three point harness is used for a center seat, the shoulder harness and buckle, when unused, cross the seat in a manner that may obstruct use of the seat by other passengers.

Some known removable seat belt systems exist. Unfortunately, many known removable seat belt systems are also limited in many respects. For example, many such removable seat belt systems enable the shoulder harness to be removed from the lap belt. Therefore, the user may neglect to use the shoulder harness entirely. As a result, the protective function of the three point safety harness may be impaired.

Furthermore, some known removable seat belt systems are somewhat confusing in operation. The user may have multiple interlocking members to deal with, thereby enabling the user to improperly anchor the seat belt. Again, the protective function of the three point safety harness may be impaired.

Accordingly, a need exists for a seat belt anchoring system and method for a three point safety harness that permits rapid and simple detachment of the seat belt assembly from the seat and/or the interior of the vehicle. Furthermore, a need exists for a seat belt anchoring system that permits convenient use with center seats in a vehicle. Additionally, a need exists for a seat belt anchoring system that is very simple to properly reconnect after detachment. Yet further, a need exists for a detachable seat belt anchoring system that is cost effective to manufacture and install.

SUMMARY OF THE INVENTION

The apparatus of the present invention has been developed in response to the present state of the art, and in particular, in response to the problems and needs in the art that have not yet been fully solved by current seat belt systems. Thus, the present invention discloses seat belt systems and related methods that securely restrain passengers while permitting easy stowing or removal from the seat, and simple reattachment to the seat after removal.

To achieve the foregoing, and in accordance with the invention as embodied and broadly described herein in the preferred embodiment, an enhanced three point seat belt assembly is provided. The belt of the seat belt assembly may be anchored to a seat for use, or may be detached from the seat. Thus, the seat belt assembly may be used for a center position of a bench seat, and removed when the central position is unoccupied. Furthermore, the seat belt assembly may be used with a versatile seating system to permit reconfiguration or removal of the seat.

In one configuration, the seat belt assembly includes a retractor disposed near an upper portion of a backrest of an automobile seat. A belt extends from the retractor, which is designed to take up slack in the belt, and to lock the belt against withdrawal from the retractor in the event of a collision. The belt has a distal end designed to be attached to a static attachment feature through the use of an interlocking buckle. When the interlocking buckle is attached to the static attachment feature, the seat belt assembly is in the anchored configuration.

A movable attachment feature is slidably coupled to the belt, and is designed to be anchored within a static buckle. When the seat belt assembly is in the anchored configuration, an occupant of the seat may attach the movable attachment feature to the static buckle to buckle themselves in the seat. The lap belt and shoulder harness are both present to provide maximum protection.

When the occupant wishes to detach the belt from the seat, the occupant releases the movable attachment feature from the static buckle. Then, the occupant inserts the movable attachment feature into the interlocking buckle and presses a button of the interlocking buckle to enable the interlocking buckle to release the static attachment feature. After the static attachment feature has been released, the seat belt assembly is in the free configuration and the belt is able to be withdrawn from the seat, together with the interlocking buckle. Thus, the belt can be removed when not in use to enhance the comfort of other occupants of the seat. Additionally, removal of the belt permits the seat to be reconfigured or removed.

In order to reattach the belt, the interlocking buckle may simply be drawn downward again, and the static attachment feature may be inserted into the interlocking buckle. The movable attachment feature is simultaneously released from the interlocking buckle, and may again be engaged within the static buckle to buckle the occupant into the seat.

The interlocking buckle is designed to retain either the static attachment feature or the movable attachment feature. The interlocking buckle is configured such that the static and movable attachment features can be inserted into the buckle in parallel but opposite insertion directions. The interlocking buckle has a housing within which a chassis is disposed. A latching lever is designed to be pivotally attached to the chassis. A first ejector is designed to push the static attachment feature out of the interlocking buckle, while a second ejector is designed to push the movable attachment feature out of the housing. The interlocking buckle also includes a latching block that slides with respect to the chassis to capture the static attachment feature.

The latching lever pivots with respect to the chassis to capture either the static attachment feature or the movable attachment feature. The latching lever has an anchored position, in which the latching lever captures the static attachment feature via the latching block. Additionally, the latching lever has a free position in which a latching extension of the latching lever captures the movable attachment feature.

Each of the ejectors is designed to extend to block pivotal motion of the latching lever, so that the latching lever is unable to release one attachment feature until the other attachment feature has been inserted into the interlocking buckle. The first ejector is a block coupled to a linear spring that induces it to slide with respect to the chassis. The second ejector is a cam with a torsional spring that induces it to pivot with respect to the chassis.

The interlocking buckle automatically releases the movable attachment feature upon insertion of the static attachment feature. However, the button of the interlocking buckle must be pressed along with insertion of the movable attachment feature to release the static attachment feature. Thus, there is little likelihood that a vehicle occupant will accidentally move the seat belt assembly from the anchored configuration to the free configuration.

According to one alternative embodiment, the second ejector takes the form of a retainer with a plunger driven by a linear spring to press outward from the retainer, toward the movable attachment plate. The plunger then serves the same function as the cam of the previous embodiment. More specifically, the plunger urges the movable attachment to withdraw from the interlocking buckle, and also blocks the latching lever from releasing the static attachment feature when the movable attachment feature has not been inserted.

The seat belt assembly and associated methods of the present invention permit easy detachment of the unused seat belt assembly to permit removal or reconfiguration of the seat, or simply to enhance the comfort of other occupants of the seat. Furthermore, the seat belt assembly may be easily re-anchored after detachment. Although multiple buckles and attachment features are present, the design of the seat belt assembly prevents the vehicle occupant from accidentally inserting an attachment feature into the incorrect buckle. Thus, the seat belt assembly provides simple and reliable protection in addition to detachment capability.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE
PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention provides a detachable seat belt anchoring apparatus and method whereby problems associated with previously known detachable seat belts can be resolved. More specifically, through the use of an interlocking buckle with a latching lever that retains one and only one attachment feature at a time, detachment and reattachment of the seat belt assembly can be easily accomplished. By preventing any attachment feature from being retained by the wrong buckle, the seat belt assembly reduces the probability of confusion and improper use. The manner in which the above described principles are implemented by the present invention will be described in greater detail with reference to FIGS. 1 through 7, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
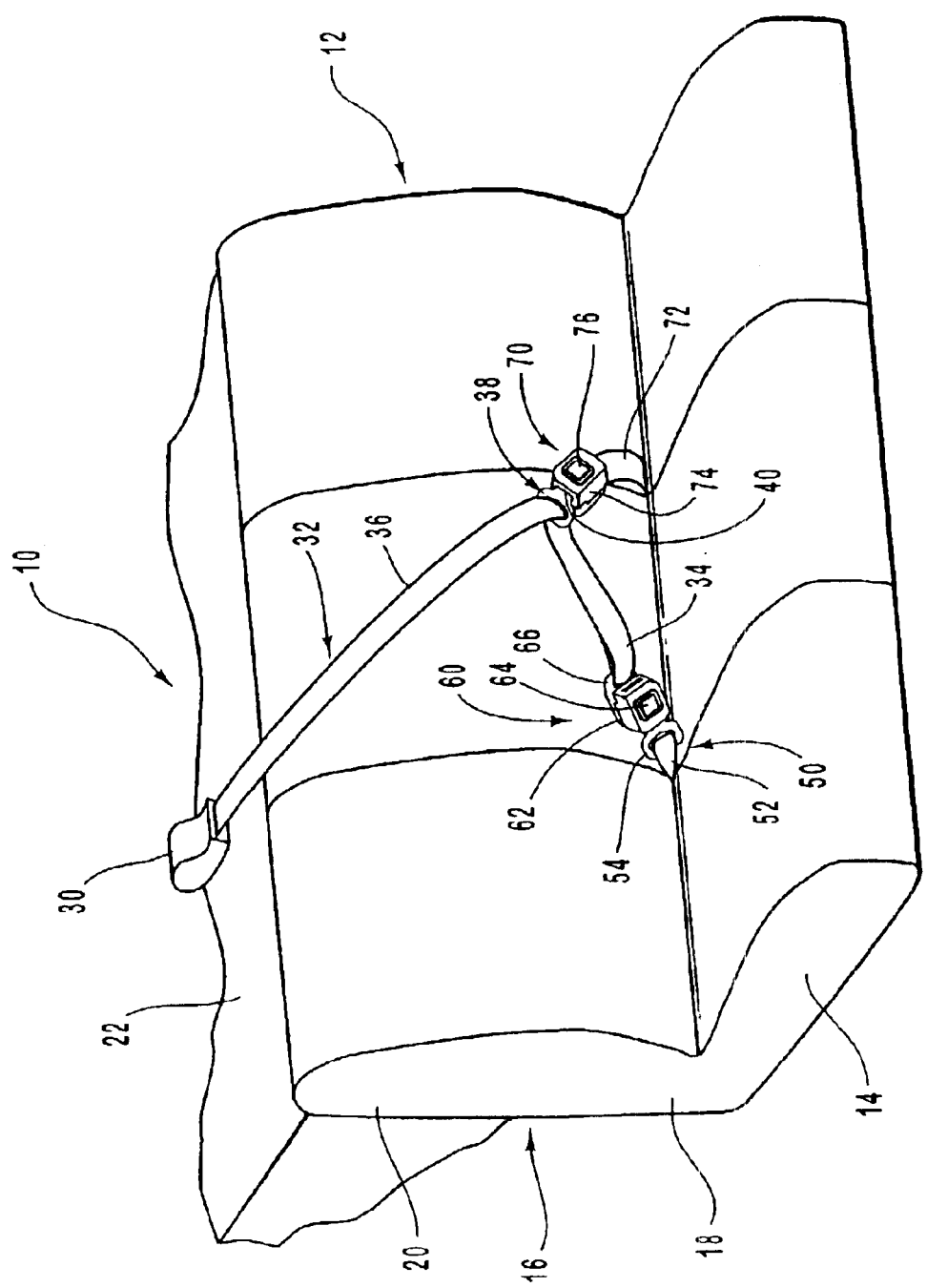
FIG. 1 is a perspective view of a seat incorporating a seat belt assembly according to one embodiment of the invention, with the seat belt assembly in the anchored and buckled configuration to provide occupant protection.

Referring to FIG. 1, a perspective view illustrates one embodiment of a seat belt assembly 10 according to the invention. In FIG. 1, the seat belt assembly 10 is in the anchored and buckled configuration. The seat belt assembly 10 is shown coupled to a seat 12, which is a bench style seat, with the seat belt assembly 10 positioned to protect an occupant of the central portion of the seat 12. The seat 12 is merely an example, a seat belt assembly according to the invention may be used with any type of seat. As shown, the seat 12 has a bottom cushion 14 and a backrest 16. The backrest 16 has a lower portion 18 and an upper portion 20. A rearward surface is positioned behind the seat 12.

The seat belt assembly 10 has an anchoring mechanism, which may take the form of a retractor 30, disposed proximate the upper portion 20 of the backrest 16. As shown, the retractor 30 may be positioned on the rearward surface 22. In the alternative, the retractor 30 may be attached to a variety of other locations, such as the upper portion 20, the interior of the vehicle, or to a belt or stiff extension attached to the vehicle interior.

A belt 32 extends from the retractor 30 downward along the backrest 16. The retractor 30 preferably comprises a spring or some other resilient mechanism that enables the retractor 30 to take up slack in the belt 32. The retractor 30 may also be configured to lock the belt 32 against withdrawal from the retractor 30 in the event of a collision. The retractor 30 may be configured in a manner similar to that of known retractors for seat belts. The retractor 30 provides the third "point" of the three point safety harness.

The belt 32 has a distal end 34 furthest from the retractor 30. The belt 32 also has an intermediate portion 36, to which a movable attachment feature 38 is slidably attached. As shown, the movable attachment feature 38 comprises a metal latch plate 40. The distal end 34 is coupled to a static attachment feature 50 disposed within the bite of the seat 12, i.e., at the junction between the bottom cushion 14 and the lower portion 18 of the backrest 16. The static attachment feature 50 is attached to the seat 12 via an anchoring belt 52. Like the movable attachment feature 38, the static attachment feature 50 also includes a metal latch plate 54.

As shown, the distal end 34 is attached to the static attachment feature 50 via an interlocking buckle 60. The interlocking buckle 60 has a housing 62 with a button 64 that is accessible to a user seated in the seat 12. The interlocking buckle 60 also includes a belt attachment plate 66 attached to the distal end 34. The belt attachment plate 66 is permanently attached to the interlocking buckle 60, while the latch plate 54 of the static attachment feature 50 is removable from the interlocking buckle 60 in a manner that will be described subsequently. When the latch plate 54 is retained by the interlocking buckle 60, the seat belt assembly 10 is in the anchored configuration.

In the anchored configuration, the seat belt assembly 10 may be used to restrain an occupant (not shown) of the seat 12. More precisely, the movable attachment feature 38 may be inserted into a static buckle 70 of the seat belt assembly. The static buckle 70 is attached to the bite of the seat 12 via an anchoring belt 72. The static buckle 70 also includes a housing 74 with a button 76 that is accessible to an occupant of the seat 12. The static buckle 70 may be configured in a manner similar to that of known seat belt buckles. Thus, the seat belt assembly 10 is in the buckled configuration as well as in the anchored configuration.

The occupant can release the seat belt assembly 10 by pressing the button 76 of the static buckle 70. The resulting configuration will be shown and described in connection with FIG. 2.

Figure 2:
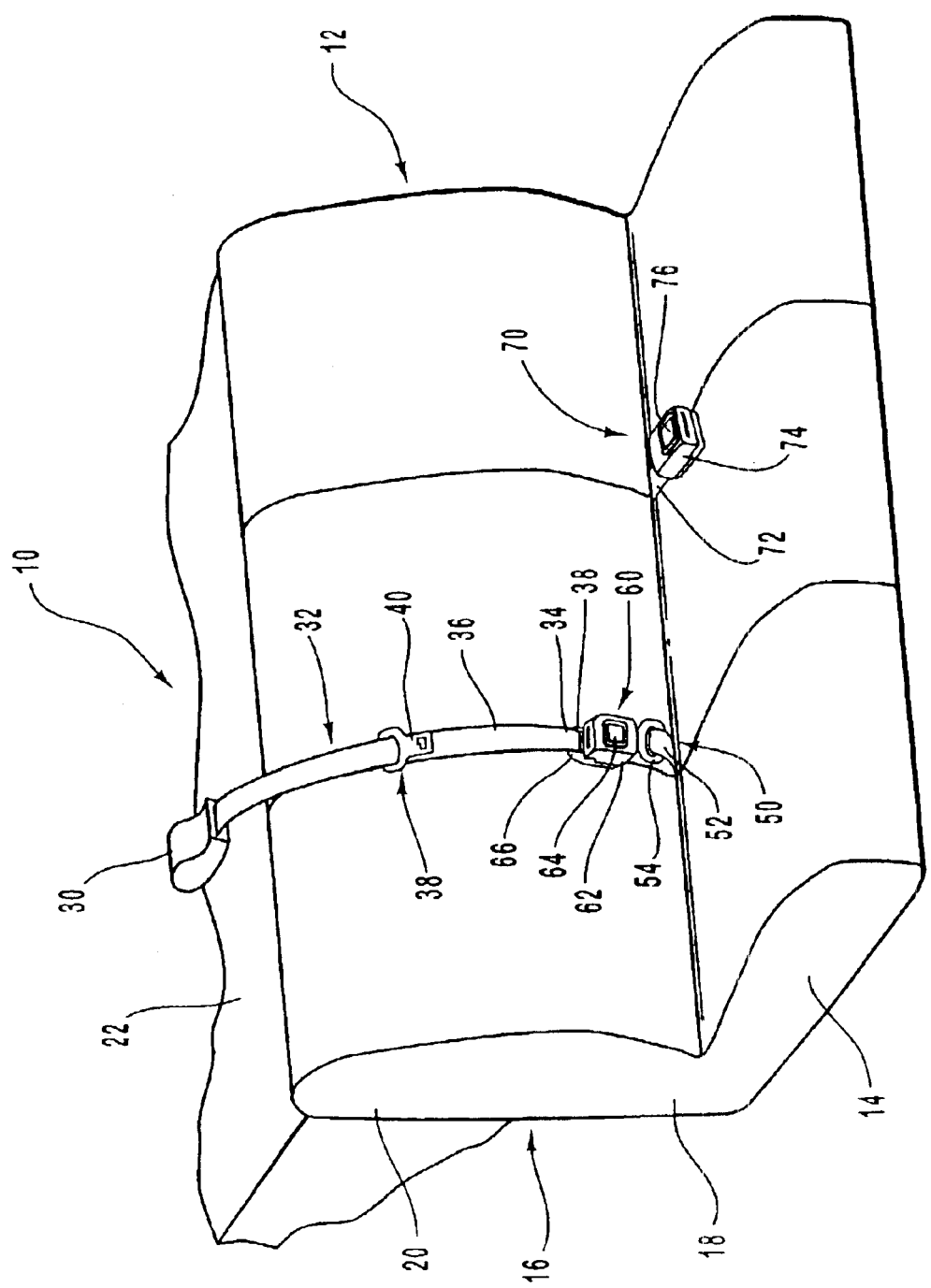
FIG. 2 is a perspective view of the seat and seat belt assembly of FIG. 1, with the seat belt assembly in the anchored, unbuckled configuration.

Referring to FIG. 2, a perspective view illustrates the seat belt assembly 10 of FIG. 1 in the anchored, unbuckled configuration. When the button 76 is pressed, the movable attachment feature 38 is released from the static buckle 70, and the retractor 30 takes up some of the intermediate portion of the belt 32 so that the belt 32 rest generally vertically against the backrest 16.

If the occupant desires to detach the belt 32 from the seat 12 to leave the central portion of the seat 12 vacant, or to remove or reconfigure the seat 12, the occupant may insert the movable attachment feature 38 into the interlocking buckle 60 and then press the button 64 of the interlocking buckle 60. Unless the movable attachment feature 38 is inserted into the locking buckle 60, the button 64 cannot be pressed. The configuration of the seat belt assembly 10 after removal of the interlocking buckle 60 from the static attachment feature 50 will be shown and described in connection with FIG. 3.

Figure 3:
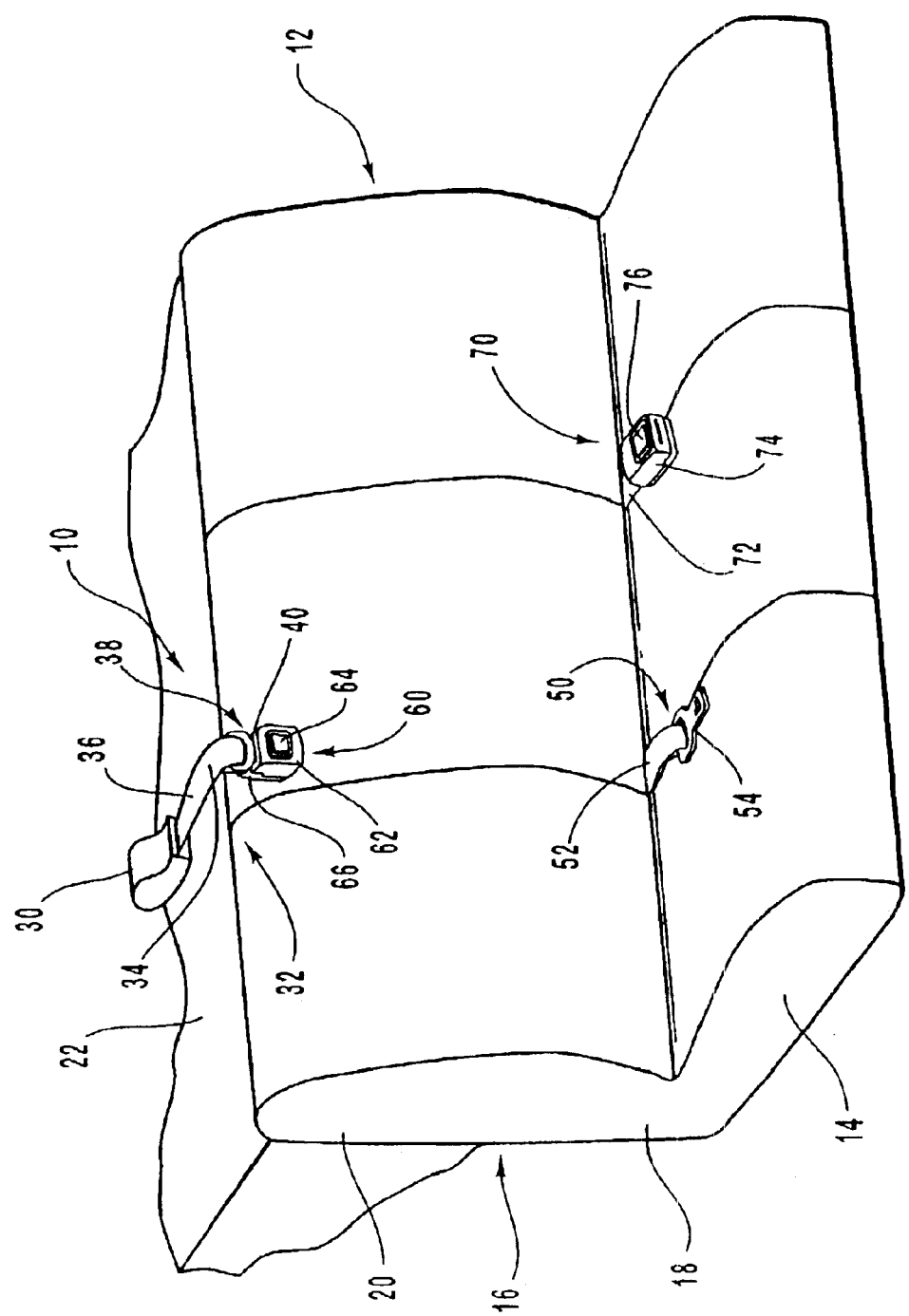
FIG. 3 is a perspective view of the seat and seat belt assembly of FIG. 1, with the seat belt assembly in the free configuration.

Referring to FIG. 3, a perspective view illustrates the seat belt assembly 10 of FIG. 1 in the free configuration. After the movable attachment feature 38 has been inserted into the interlocking buckle 60, the occupant is able to press the button 64. Pressing the button 64 then causes the interlocking buckle 60 to release the static attachment feature 50 and retain the movable attachment feature 38.

The retractor 30 can then further take up the intermediate portion 36 of the belt 32, so that the interlocking buckle 60 and the movable attachment feature 38 are carried upward, toward the retractor 30. The belt 32 no longer obstructs the seat, so that the seat belt assembly 10 will not cause discomfort for passengers on the side portions of the seat 12, and the seat 12 can be reconfigured or removed without being restrained by the seat belt assembly 10.

When the seat belt assembly 10 is in the free configuration, as shown in FIG. 3, the movable attachment feature 38 cannot be removed from the interlocking buckle 60 without moving the seat belt assembly 10 back to the anchored configuration. The interlocking buckle 60 retains the movable attachment feature 38 until the static attachment feature 50 has been inserted into the interlocking buckle 60. Thus, the occupant is unable to accidentally insert either the movable attachment feature 38 or the static attachment feature 50 into the wrong buckle. Consequently, the seat belt assembly 10 is very difficult, if not impossible, to anchor and buckle improperly.

Figure 4:
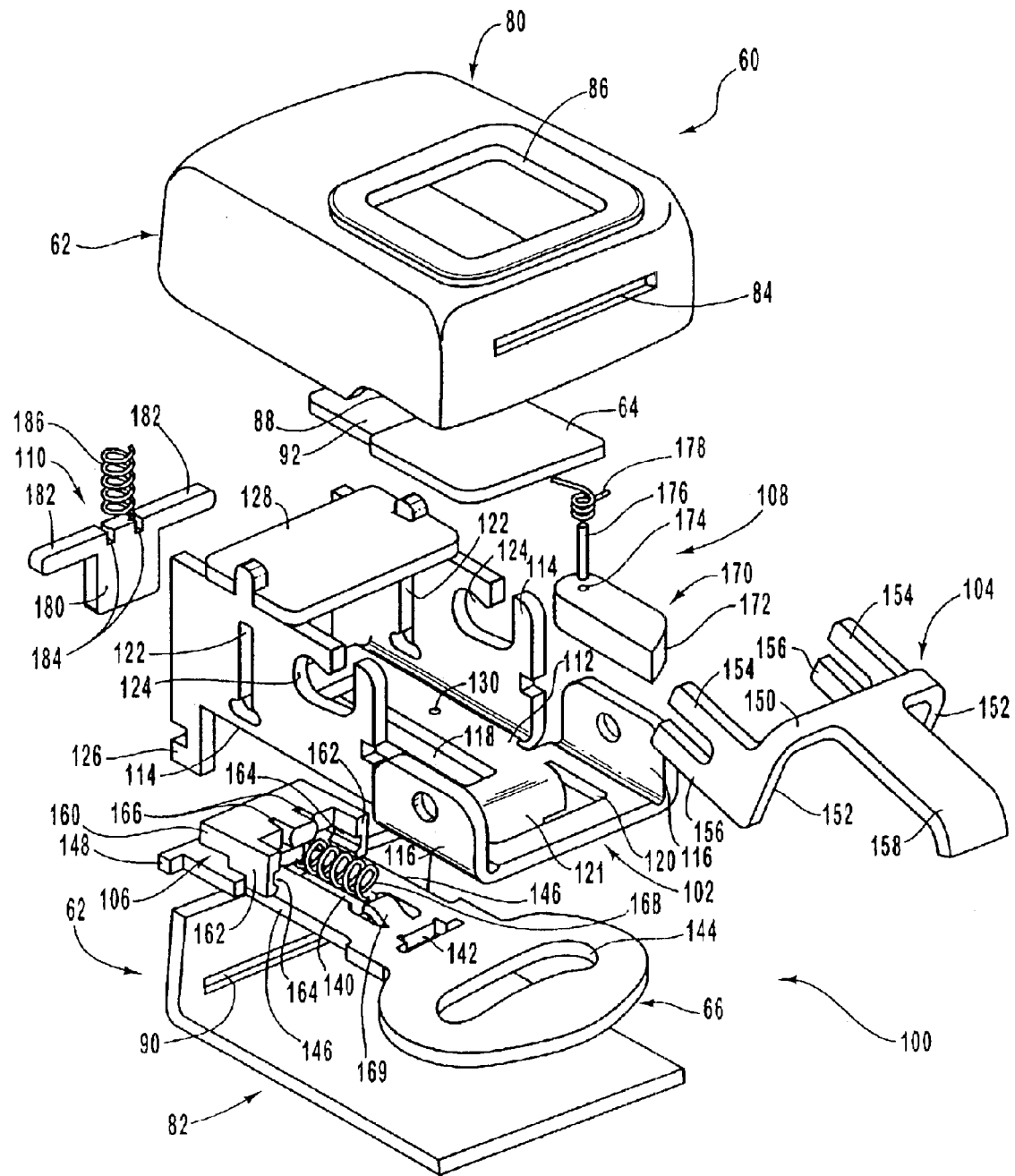
FIG. 4 is an exploded, perspective view of one embodiment of an interlocking buckle suitable for the seat belt assembly of FIG. 1.

The interlocking buckle 60 may be embodied in a wide variety of ways. Advantageously, the interlocking buckle 60 may have a comparatively compact configuration, in which the movable attachment feature 38 and the static attachment feature 50 are inserted in generally parallel directions. Preferably, the interlocking buckle 60 is also inexpensive and easy to manufacture. FIG. 4 depicts one embodiment of an interlocking buckle suitable for the seat belt assembly 10 of FIGS. 1–3.

Referring to FIG. 4, an exploded, perspective view illustrates the various components of the interlocking buckle 60. The housing 62 has a first portion 80 and a second portion 82, which fit together to form a generally rectangular prismoidal shape. A slot 84 is formed in the first portion 84 to receive the movable attachment feature 38. The first portion 84 also has a window 86 designed to permit user access to the button 64 and a recess 88 shaped to permit the belt attachment plate 66 to extend out of the interior of the housing 62 for attachment to the distal end 34.

The second portion 82 has a slot 90 to receive the static attachment feature 50. The button 64 is coupled to the first portion 80 through the use of a resilient mechanism, such as a leaf spring 92. The button 64 is urged against the window 86 by the leaf spring 92 for easier actuation.

The interlocking buckle 60 also includes a number of components within the housing 62. More specifically, the interlocking buckle 60 has a chassis 100, which includes a main portion 102 designed to receive most of the remaining components of the interlocking buckle 60. The chassis 100 also includes the belt attachment plate 66, which may also receive other components of the interlocking buckle 60.

A latching lever 104 is designed to be pivotally attached to the main portion 102 of the chassis 100 to retain the movable attachment feature 38 or the static attachment feature 50. A first ejector 106 is designed to move along the belt attachment plate 66 to urge the static attachment feature 50 to withdraw from the interlocking buckle 60. The first ejector 106 also indirectly blocks pivotal motion of the latching lever 104 when the static attachment feature 50 has been removed, so that the movable attachment feature 38 cannot be removed from the interlocking buckle 60 without inserting the static attachment feature 50.

Similarly, a second ejector 108 is designed to pivot to urge the movable attachment feature 38 to withdraw from the interlocking buckle. The second ejector 108 also directly blocks pivotal motion of the latching lever 104 when the movable attachment feature 38 has been removed so that the static attachment feature 50 cannot be removed without inserting the movable attachment feature 38. A latching block 110 is designed to operate in conjunction with the latching lever 104 to retain the static attachment feature 50.

The main portion 102 is shaped to provide retention of a number of other components of the interlocking buckle 60. More precisely, the main portion 102 has a central plate 112 and a pair of side plates 114 that extend generally perpendicular to the central plate 112. A pair of flanges 116 also extends perpendicular to the central plate 112. The flanges 116 are spaced apart somewhat more widely than the side plates 114.

An ejector slot 118 is formed along the length of the central plate 112, and is positioned generally between the side plates 114. The ejector slot 118 accommodates the first ejector 106. An attachment slot 120 is formed in the central plate 112 between the flanges 116. An attachment tab 121 extends from the attachment slot 120 to facilitate attachment of the main portion 102 to the belt attachment plate 66.

Each of the side plates 114 has a latching block retention slot 122 extending generally perpendicular to the central plate 112. Additionally, each of the side plates 114 has a lever retention slot 124 designed to pivotally receive the latching lever 104. The lever retention slots 124 may be generally arcuate in configuration so that the latching lever 104 is unable to withdraw directly from the lever retention slots 124.

Each of the side plates 114 has an attachment extension 126 designed to interlock with the belt attachment plate 66. Each of the attachment extensions 126 has a notched configuration designed to securely retain one end of the belt attachment plate 66, while the opposite end of the belt attachment plate 66 is retained by the attachment tab 121.

The main portion 102 also has a backing plate 128 attached to the side plates 114, in line with the latching block retention slots 122. The backing plate 128 supports the resilient motion of the latching block 110, in a manner that will be described in greater detail subsequently. The central plate 112 has an ejector retention hole 130 to one side of the ejector slot 118. The ejector retention hole 130 is designed to pivotally retain the second ejector 108 in a manner that will be described subsequently.

The belt attachment plate 66 has an ejector slot 140 parallel to the ejector slot 118 of the main portion 102. The belt attachment plate 66 also has an attachment slot 142 configured to receive the attachment tab 121 of the central plate. The attachment tab 121 may be folded or bent behind the attachment slot 142 to keep the attachment tab 121 within the attachment slot 142.

The belt attachment plate 66 also has a belt attachment slot 144, which may have an arcuate shape designed to permit the interlocking buckle 60 to pivot with respect to the distal end 34 of the belt 32. The belt attachment plate 66 has a pair of grooves 146 designed to retain the first ejector 106 in a manner that will be described subsequently. Furthermore, a pair of attachment prongs 148 of the belt attachment plate is designed to interlock with the notches of the attachment extensions 126 of the main portion 102 to facilitate attachment of the belt attachment plate 66 to the main portion 102.

The latching lever 104 has a pivoting rail 150 that fits into the lever retention slots 124 of the side plates 114 in such a manner that the latching lever 104 is able to pivot or rock within the lever retention slots 124. Extensions 152 extend from either side of the pivoting rail 150, toward the central plate 112. Furthermore, the latching lever 104 has a pair of first latching arms 154 and a pair of second latching arms 156 that extend from the extensions 152 toward the latching block retention slots 122. The first and second latching arms 154, 156 serve to couple the latching lever 104 to the latching block 110 in a manner that will be described subsequently. The latching lever also has a latching extension 158 designed to retain the movable attachment feature 38.

As shown in FIG. 4, the first ejector 106 is designed to translate between the main portion 102 and the belt attachment plate 66 to urge the static attachment feature 50 to withdraw from the interlocking buckle 60. More specifically, the first ejector 106 has a blocking plate 160 designed to slide along the belt attachment plate 66. The blocking plate 160 has a pair of retention arms 162 extending toward the belt attachment plate 66. Each of the retention arms 162 has a groove 164 oriented toward the other retention arm 162. The retention arms 162 cooperate to grip the portion of the belt attachment plate 66 between the grooves 162 of the belt attachment plate 66. The grooves 162 define the range of motion of the blocking plate 160.

The blocking plate 160 also has arcuate grooves 166 shaped to receive one end of a linear spring 168. The linear spring seats against a tab 169 in the belt attachment plate 66 and operates to press the blocking plate 160 away from the tab 169. The blocking plate 160 is aligned with the slot 90 so that the blocking plate 160 urges the static attachment feature 50 to withdraw from the slot 90.

The second ejector 108 has a cam member 170 designed to pivot with respect to the main portion 102. The cam member 170 has a curved distal surface 172 designed to contact the movable attachment feature 38. The cam member 170 also has a pivot hole 174. A shaft 176 is inserted through the pivot hole 174 and through the ejector retention hole 130 of the main plate 102.

A torsional spring 178 is attached to the cam member 170 and to some part of the main portion 102 of the chassis 100. For example, the torsional spring 178 is attached to one of the side walls 114 so that the torsional spring 178 urges the cam member 170 to rotate into a position in which the cam member 170 is generally parallel with the side walls 114. Thus, the cam member 170 urges the movable attachment feature 38 to withdraw from the slot 84.

The latching block 110 has a latching extension 180 oriented toward the belt attachment plate 66 to retain the static attachment feature 50. Additionally, the latching block 110 has retention arms 182 designed to extend through the latching block retention slots 122. The retention arms 182 extend between the first latching arms 154 and the second latching arms 156 of the latching lever 104.

Thus, motion of the latching extension 158 of the latching lever 104 toward the central plate 112 causes the second latching arms 156 to press the latching block 110 away from the central plate 112. Similarly, motion of the latching block 110 toward the central plate 112 presses the second latching arms toward the central plate 112 so that the latching lever 104 pivots to move the latching extension 158 away from the central plate 112.

The latching block 110 also has arcuate grooves 184 configured to receive one end of a linear spring 186. The opposite end of the linear spring 186 rests against the backing plate 128 of the main portion 102. If desired, corresponding arcuate grooves (not shown) may be formed in the backing plate 128 to receive the opposite end of the linear spring 186. The linear spring 186 urges the latching block 110 toward the central plate 112. Since the retention arms 182 are disposed between the first and second latching arms 154, 156 of the latching lever 104, the linear spring 186 simultaneously urges the latching lever 104 to pivot in such a manner that the latching extension 158 is drawn away from the central plate 112.

The interlocking buckle 60 may be assembled in a variety of ways. According to one example, the first ejector 106 is first coupled to the belt attachment plate 66 by disposing the grooves 164 of the retention arms 162 of the blocking plate 160 in engagement with the grooves 146 of the belt attachment plate 66. The retention arms 162 may be made slightly resilient so that they are able to bend to permit the retention arms 162 to "snap" into engagement with the grooves 146. The linear spring 168 is compressed and inserted into engagement with the arcuate slots 166 and the tab 169.

The belt attachment plate 66 is then attached to the main portion 102 to form the chassis 100. More specifically, the attachment prongs 148 are inserted into the grooves of the attachment extensions 126, and the attachment tab 121 is oriented generally perpendicular to the central plate 112. The attachment tab 121 is inserted through the attachment slot 142 and then folded or bent so that the attachment tab 121 cannot be withdrawn back through the attachment slot 142.

The latching block 110 is then inserted into engagement with the main portion 102 such that the retention arms 182 extend through the latching block retention slots 122 of the side plates 114. The linear spring 186 is then compressed and inserted between the arcuate slots 184 and the backing plate 128, and allowed to expand to engage the arcuate slots 184 and the backing plate 128.

The second ejector 108 is then installed by inserting the shaft 176 through the pivot hole 174 of the cam member 170 and the ejector retention hole 130 of the central plate 112. The torsional spring 178 is attached to the cam member 170 and one of the side walls 114.

The latching lever 104 is then installed by inserting the pivoting rail 150 into the lever retention slots 124 of the side walls 114. The latching lever 104 is inserted in such a manner that the first and second latching arms 154, 156 are positioned on either side of the ends of the retention arms 182.

The button 64 is installed by attaching the button 64 to the leaf spring 92 and attaching the leaf spring 92 to the interior of the first portion 80 of the housing 62. The first and second portions 80, 82 of the housing 62 are then attached together to enclose the chassis 100 and the other assembled components 104, 106, 108, 110.

The foregoing is only one possible configuration and one possible mode of assembly. Those of skill in the art will recognize that the various parts of the interlocking buckle 60 may be configured in a wide variety of ways, and may be assembled according to a variety of methods. The operation of the interlocking buckle 60 will be further shown and described in connection with FIGS. 5 and 6.

Figure 5:
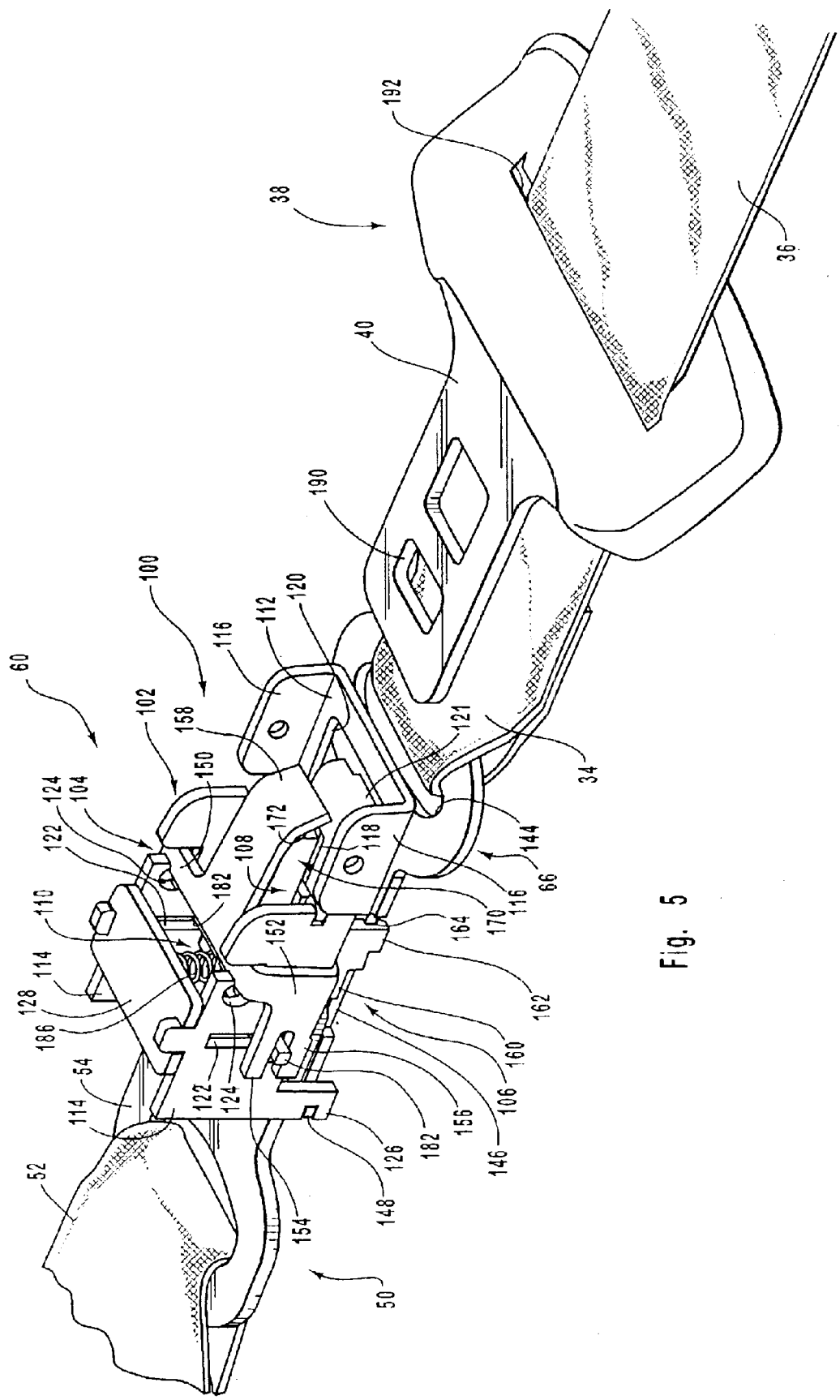
FIG. 5 is a perspective view of the interlocking buckle with the housing removed, with the latching lever in the anchored position to capture the static attachment feature.

Referring to FIG. 5, a perspective view of the interlocking buckle 60 is shown, with the housing 62, button 64, and leaf spring 92 removed. The interlocking buckle 60 is in the anchored configuration. Therefore, the static attachment feature 50 is retained by the interlocking buckle 60, and the movable attachment feature 38 is not retained by the interlocking buckle 60.

The movable attachment feature 38 may be retained by the static buckle 70, as depicted in FIG. 1, to provide the anchored and latched configuration of the seat belt assembly 10, or may be free, as depicted in FIG. 2, to provide the anchored and unlatched configuration. As depicted in FIG. 5, the latch plate 40 of the movable attachment feature 38 has an aperture 190 designed to be retainable by the latching extension 158 of the latching lever 104. Additionally, the movable attachment feature 38 has a slot 192 through which the belt 32 passes.

As shown, the latching lever 104 is disposed at an orientation such that the latching block 110 is positioned toward the central plate 112, in engagement with the latch plate 54 of the static attachment feature 50. The blocking plate 160 of the first ejector 106 abuts the latch plate 54, and is therefore retracted. Thus, the blocking plate 160 is positioned toward the tab 169.

The cam member 170 of the second ejector 108 is extended, and therefore disposed between the latching extension 158 of the latching lever 104 and the central plate 112. Consequently, the cam member 170 blocks pivotal motion of the latching extension 158 toward the central portion. The linear spring 186 of the latching block 110 also acts to prevent such pivotal motion of the latching lever 104.

When the latch plate 40 of the movable attachment feature 38 is inserted into the interlocking buckle 60, it presses against the cam member 170 of the second ejector 108. The cam member 170 rotates, and thus ceases to obstruct motion of the latching extension 158 toward the central plate 112. Thus, the latching lever 104 is able to rotate if the resilient force of the linear spring 186 of the latching block 110 can be overcome.

The button 64 is positioned generally adjacent to the latching extension 158. After the movable attachment feature 38 has been inserted into the interlocking buckle 60 to move the second ejector 108, the user may press the button 64 to induce pivotal motion of the latching lever 104 from the anchored position to the free position.

More precisely, the latching extension 158 pivots into engagement with the aperture 190 of the movable attachment feature 38. Simultaneously, the latching block 110 is urged away from the central plate 112 by the second latching arms 158 of the latching lever 104. The latch plate 54 of the static attachment feature 50 is released from the interlocking buckle 60, and the blocking plate 160 of the first ejector 106 moves between the latching block 110 and the central plate 112. Thus, the blocking plate 160 blocks pivotal motion of the latching lever 104 from the free position back to the anchored position.

Figure 6:
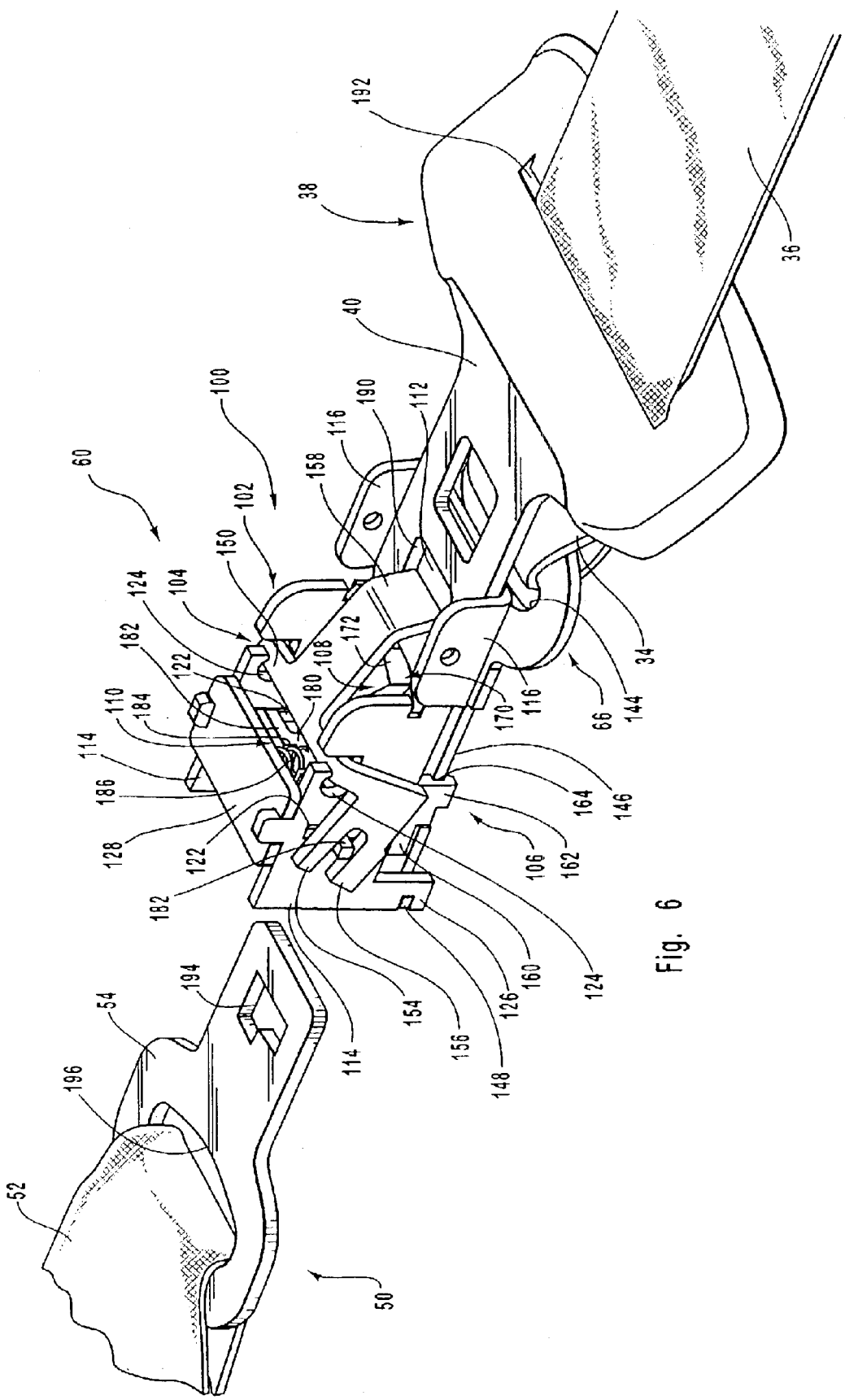
FIG. 6 is a perspective view of the interlocking buckle with the housing removed, with the latching lever in the free position to capture the movable attachment feature.

Referring to FIG. 6, a perspective view of the interlocking buckle 60 is shown, with the housing 62, button 64, and leaf spring 92 removed. In FIG. 6, the latching lever 104 has been pivoted to the free position by following the steps recited above. Consequently, the seat belt assembly 10 is in the free configuration, as depicted in FIG. 3.

The latching extension 158 of the latching lever 104 extends into the aperture 190 of the latch plate 40 of the movable attachment feature 38, thereby retaining the movable attachment feature 38. The cam member 170 of the second ejector 108 has been rotated into a retracted position. The blocking plate 160 of the first ejector 106 is extended to block motion of the latching block 110 toward the central plate 112. The latching lever 104 is kept in the free position by the blocking plate 160 until the static attachment feature 50 is again inserted into the interlocking buckle 60 to move the blocking plate 160, thereby allowing the latching lever 104 to pivot back to the anchored position.

Like the movable attachment feature 38, the static attachment feature 50 has an aperture 194 and a slot 196 through which the anchoring belt 52 passes. When the interlocking buckle 60 is in the anchored configuration, as depicted in FIG. 5, the latching extension 180 of the latching block 110 extends into the aperture 194, thereby retaining the movable attachment feature 38.

The configuration of FIGS. 4, 5, and 6 is only one possible interlocking buckle arrangement. Many alternative arrangements may be used to provide similar operation. One such alternative arrangement will be shown and described in connection with FIG. 7.

Figure 7:
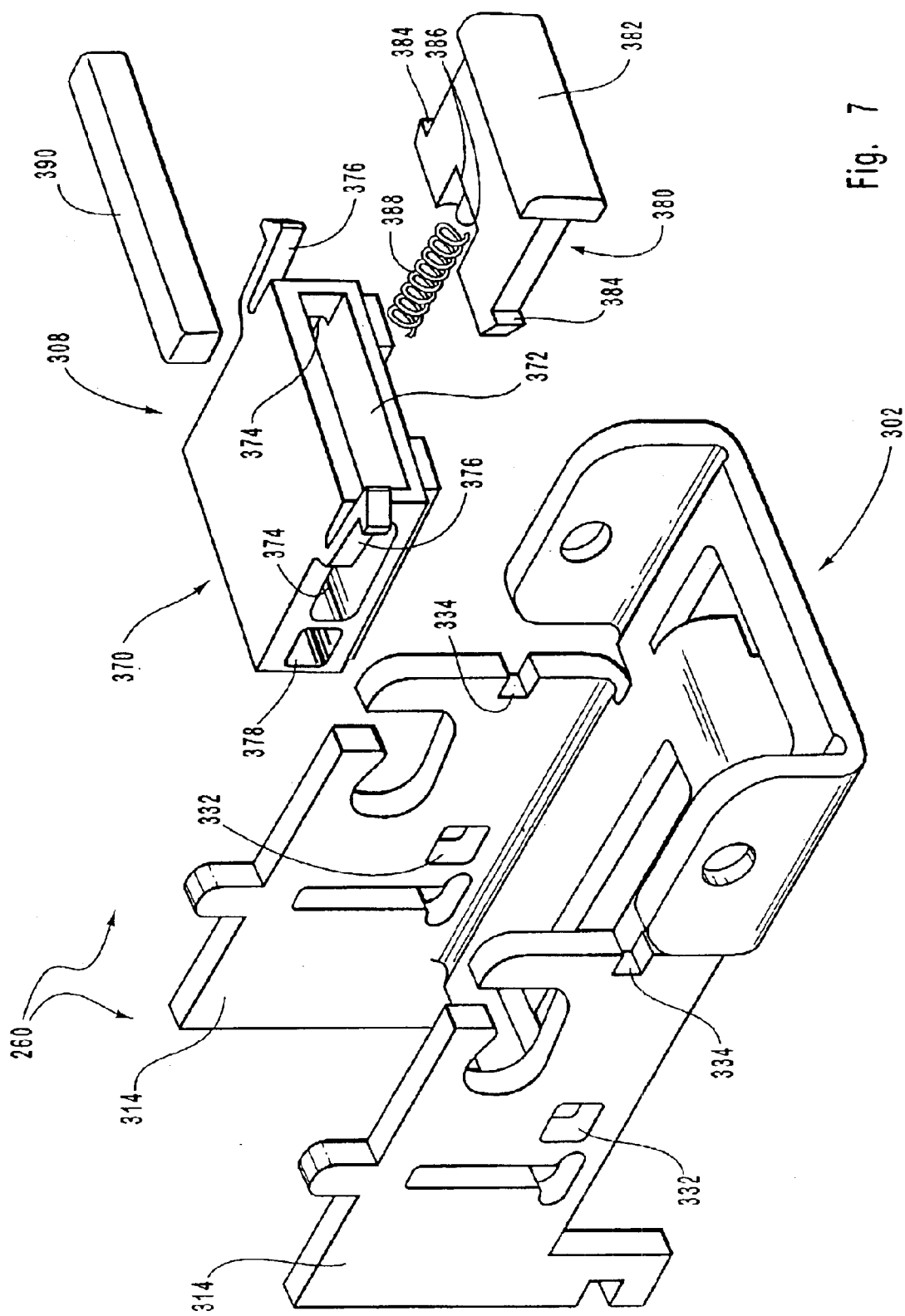
FIG. 7 is an exploded, perspective view of a portion of an alternative embodiment of an interlocking buckle suitable for a detachable seat belt assembly.

Referring to FIG. 7, a perspective view illustrates an interlocking buckle 260 according to one alternative embodiment of the invention. The interlocking buckle 260 may be used in conjunction with a seat belt assembly like the seat belt assembly 10 of FIG. 1. The interlocking buckle 260 may have a housing 62, button 64, and leaf spring 92 like those of the previous embodiment. These components have been omitted for clarity.

As shown, the interlocking buckle 260 has a main portion 302, which is combined with a belt attachment plate 66, like that of the previous embodiment, to form a chassis. The main portion 302 has a pair of side walls 314 disposed on either side of the central plate 112. The main portion 302 has features similar to the previous embodiment, except for addition of a pair of ejector fixation holes 332 and a pair of ejector fixation grooves 334, all of which are disposed on the side walls 314. The interlocking buckle 260 also has a latching lever 104, a first ejector 106, and a latching block 110 similar to those of the previous embodiment. These components have also been omitted for clarity.

The interlocking buckle 260 has a second ejector 308, which is configured differently from the second ejector 108 of the previous embodiment. Rather than pivoting, the second ejector 308 translates to urge the movable attachment feature 38 to withdraw from the interlocking buckle 260.

The second ejector 308 has retainer 370, which may generally have the shape of a rectangular prism. The retainer 370 has a slot 372 and side openings 374 in communication with the slot 372. Additionally, the retainer 370 has a pair of locking arms 376 extending from either side. An anchoring hole 378 extends through the retainer 370, in line with the side openings 374.

The retainer 370 is designed to retain a plunger 380, which is extensible from the retainer 370. The plunger 380 has a head 382, which may be sized too large to fit into the slot 372. Additionally, the plunger 380 has a pair of retention tabs 384 extending from either side. The plunger 380 has arcuate grooves 386 designed to receive one end of a linear spring 388. Upon insertion of the plunger 380 into the slot 372, the other end of the linear spring 388 is seated against the interior of the slot 372, which may also have arcuate grooves (not shown) if desired.

When the plunger 380 is inserted into the slot 372, the retention tabs 384 are disposed within, and possibly extend slightly from, the side openings 374. If desired, the retention tabs 384 may be made slightly resilient so that the retention tabs 384 are able to deform to permit insertion of the retention tabs into the slot 372. The retention tabs 384 may then "snap" into position within the side openings 374. The retention tabs 384 then keep the plunger 380 from leaving the retainer 370.

The retainer 370 is attached to the main portion 302 via the ejector fixation holes 332 and the ejector fixation grooves 334. More precisely, after the plunger 380 and the linear spring 388 have been inserted into the slot 372, the retainer 370 is positioned such that the locking arms 376 engage the ejector fixation grooves 334 of the side walls 314.

The anchoring hole 378 will then be aligned with the ejector fixation holes 332 of the side walls 314. An anchoring shaft 390 is inserted through the anchoring hole 378 and the ejector fixation holes 332 to fix the retainer 370 in place. When the interlocking buckle 260 is assembled, the housing 62 of the interlocking buckle 260 blocks withdrawal of the anchoring shaft 390 from the ejector fixation holes 332 and the anchoring hole 378.

The interlocking buckle 260 operates in a manner somewhat similar to that of the previous embodiment. More precisely, the plunger 380 of the second ejector 308 extends to block pivotal motion of the latching lever 104 when the interlocking buckle 260 is in the anchored configuration.

Upon insertion of the movable attachment feature 38, the plunger 380 is pressed further into the slot 372, thereby unblocking pivotal motion of the latching lever 104. The button 64 may then be pressed to move the latching lever 104 from the anchored position to the free position, thereby releasing the static attachment feature 50 and retaining the movable attachment feature 38. The second ejector 308 urges the movable attachment feature 38 to withdraw from the interlocking buckle 260.

The seat belt anchoring apparatus and method of the present invention, as embodied in the seat belt assembly, present a significant improvement in seat belt design. The seat belt assembly of the present invention is easily detachable from an automobile seat to enhance the comfort of adjacent passengers, or to enable removal or reconfiguration of the seat. Furthermore, the seat belt assembly is easily reattached in a manner that reduces the likelihood of improper or incomplete reattachment. Thus, the seat belt assembly provides detachment as well as reliable three point impact protection.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An interlocking buckle for a seat belt assembly for restraining an occupant of a seat of a vehicle, the interlocking buckle comprising:
   a first end configured to receive a static attachment feature in a first insertion direction;
   a second end configured to receive a movable attachment feature in a second insertion direction non-perpendicular to the first insertion direction; and
   a latching lever configured to move between an anchored position that retains only the static attachment feature and a free position that retains only the movable attachment feature;
further comprising a latching block coupled to the latching lever such that the latching block blocks withdrawal of the static attachment feature when the latching lever is in the anchored position.

2. The interlocking buckle of claim 1, wherein the first and second insertion directions are substantially parallel to each other.

3. The interlocking buckle of claim 1, further comprising a user control operable to move the latching lever from the anchored position to the free position.

4. The interlocking buckle of claim 1, further comprising:
   a first ejector configured to urge the static attachment feature to withdraw from the first end; and
   a second ejector configured to urge the movable attachment feature to withdraw from the second end, wherein the second ejector operates independently of the first ejector.

5. A seat belt assembly for restraining an occupant of a seat of a vehicle, the seat having a bottom cushion and a backrest with a lower portion and an upper portion, the seat belt assembly comprising:
   an anchoring mechanism disposed proximate the upper portion;
   a static buckle disposed proximate the bottom cushion;
   a static attachment feature disposed proximate the bottom cushion;
   a belt extending from the anchoring mechanism;
   a movable attachment feature coupled to the belt, wherein the movable attachment feature is configured to interlock with the static buckle such that the belt forms a shoulder harness for the occupant; and
   an interlocking buckle coupled to the belt, wherein the interlocking buckle is configured to receive the static attachment feature in a first insertion direction and to receive the movable attachment feature in a second insertion direction non-perpendicular to the first insertion direction, the interlocking buckle having a latching lever configured to move between an anchored position that retains only the static attachment feature and a free position that retains only the movable attachment feature
   wherein the interlocking buckle further comprises:
   a first ejector configured to urge the static attachment feature to withdraw from the interlocking buckle; and
   a second ejector configured to urge the movable attachment feature to withdraw from the interlocking buckle, wherein the second ejector operates independently of the first ejector.

6. The seat belt assembly of claim 5, wherein the belt extends between the interlocking buckle and the movable attachment feature such that the belt forms a lap restraint for the occupant.

7. The seat belt assembly of claim 5, wherein the anchoring mechanism comprises a retractor configured to take up slack in the belt.

8. The seat belt assembly of claim 5, wherein the static attachment feature comprises a latch plate configured to be inserted into a first end of the interlocking buckle.

9. The seat belt assembly of claim 8, wherein the movable attachment feature comprises a latch plate configured to be inserted into a second end of the interlocking buckle.

10. The seat belt assembly of claim 5, wherein the interlocking buckle further comprises a user control operable to move the latching lever from the anchored position to the free position.

11. An interlocking buckle for a seat belt assembly for restraining an occupant of a seat of a vehicle, the interlocking buckle comprising:
    a first receiving interface configured to receive a static attachment feature;
    a second receiving interface configured to receive a movable attachment feature; and
    a user control operable to move the interlocking buckle from an anchored configuration in which the interlocking buckle retains only the static attachment feature to a free configuration in which the interlocking buckle retains only the movable attachment feature wherein the user control comprises a button configured to be pressed by a user.

12. The interlocking buckle of claim 11, further comprising a latching lever with an anchored position corresponding to the anchored configuration, and a free position corresponding to the free configuration, wherein the user control is coupled to the latching lever such that activation of the user control moves the latching lever from the anchored position to the free position.

13. The interlocking buckle of claim 11, further comprising a latching block coupled to the latching lever such that the latching block blocks withdrawal of the static attachment feature when the latching lever is in the anchored configuration, the latching lever comprising a latching extension that blocks withdrawal of the movable attachment feature when the latching lever is in the free configuration.

14. An interlocking buckle for a seat belt assembly for restraining an occupant of a seat of a vehicle, the interlocking buckle comprising:
    a first receiving interface configured to receive a static attachment feature;
    a second receiving interface configured to receive a movable attachment feature;
    a first ejector configured to urge the static attachment feature to withdraw from the first receiving interface; and
    a second ejector configured to urge the movable attachment feature to withdraw from the second receiving interface, wherein the second ejector operates independently of the first ejector.

15. The interlocking buckle of claim 14, further comprising a chassis, wherein the first ejector is slidably attached to the chassis.

16. The interlocking buckle of claim 15, wherein the second ejector is rotationally attached to the chassis, the second ejector having a blocking cam urged to rotate by a torsional spring.

17. The interlocking buckle of claim 15, wherein the second ejector is slidably attached to the chassis, the second ejector having a blocking plunger urged to extend from an ejection block by at least one linear spring.

18. The interlocking buckle of claim 14, wherein the first ejector is configured to block withdrawal of the movable attachment feature from the interlocking buckle in response to withdrawal of the static attachment feature from the interlocking buckle, and wherein the second ejector is configured to block withdrawal of the static attachment feature in response to withdrawal of the movable attachment feature from the interlocking buckle.

19. The interlocking buckle of claim 18, wherein the second ejector is configured to unblock withdrawal of the movable attachment feature from the interlocking buckle in response to insertion of the static attachment feature into the interlocking buckle so that insertion of the static attachment feature induces ejection of the movable attachment feature.

20. The interlocking buckle of claim 14, wherein the first and second ejectors are further configured to urge withdrawal of the static and movable attachment features along substantially opposite directions.

21. A method for moving a seat belt assembly from an anchored configuration to a free configuration, the seat belt assembly comprising a static attachment feature, a movable attachment feature coupled to a belt, and an interlocking buckle having a first end configured to receive the static attachment feature, a second end configured to receive the movable attachment feature, and a user control comprising a button, the method comprising:
    activating the user control by pressing the button;
    releasing the static attachment feature from the interlocking buckle in response to activation of the user control to permit removal of the static attachment feature from the interlocking buckle; and
    retaining the movable attachment feature in the interlocking buckle in response to activation of the user control to prevent removal of the movable attachment feature by the interlocking buckle.

22. The method of claim 21, wherein the interlocking buckle further comprises a latching lever, wherein releasing the static attachment feature from the interlocking buckle comprises pivoting the latching lever to unblock withdrawal of the static attachment feature from the interlocking buckle.

23. The method of claim 22, wherein the interlocking buckle further comprises a latching block coupled to the latching lever, wherein releasing the static attachment feature from the interlocking buckle further comprises moving the latching block in response to pivotal motion of the latching lever to unblock withdrawal of the static attachment feature from the interlocking buckle.

24. The method of claim 22, wherein the latching lever comprises a latching extension, wherein retaining the movable attachment feature comprises pivoting the latching extension to block withdrawal of the movable attachment feature from the interlocking buckle.

25. The method of claim 21, wherein the interlocking buckle further comprises a first ejector configured to urge the static attachment feature to withdraw from the first end and a second ejector configured to urge the movable attachment feature to withdraw from the second end, the method further comprising pushing the static attachment feature outward with the first ejector.

26. A method for moving a seat belt assembly from a free configuration to an anchored configuration, the seat belt assembly comprising a static attachment feature, a movable attachment feature coupled to a belt, and an interlocking buckle having a first end configured to receive the static attachment feature, a second end configured to receive the movable attachment feature, and a latching lever, the method comprising:
    inserting the static attachment feature into the interlocking buckle along a first insertion direction;
    retaining the static attachment feature, wherein retaining the static attachment feature comprises pivoting the latching lever in response to insertion of the static attachment feature; and
    releasing the movable attachment feature in response to pivoting of the latching lever to permit removal of the movable attachment feature along a direction opposite to a second insertion direction non-perpendicular to the first insertion direction.

27. The method of claim 26, wherein the first and second insertion directions are substantially parallel to each other.

28. The method of claim 26, wherein the interlocking buckle further comprises a latching block coupled to the latching lever, wherein retaining the static attachment feature from the interlocking buckle further comprises moving the latching block in response to pivotal motion of the latching lever to block withdrawal of the static attachment feature from the interlocking buckle.

29. The method of claim 26, wherein the latching lever comprises a latching extension, wherein releasing the movable attachment feature comprises pivoting the latching extension to unblock withdrawal of the movable attachment feature from the interlocking buckle.

30. The method of claim 26, wherein the interlocking buckle further comprises a first ejector configured to urge the static attachment feature to withdraw from the first end and a second ejector configured to urge the movable attachment feature to withdraw from the second end, the method further comprising pushing the movable attachment feature outward with the second ejector.

31. An interlocking buckle for a seat belt assembly for restraining an occupant of a seat of a vehicle, the interlocking buckle comprising:
    a first end configured to receive a static attachment feature in a first insertion direction;
    a second end configured to receive a movable attachment feature in a second insertion direction non-perpendicular to the first insertion direction; and
    a latching lever configured to move between an anchored position that retains only the static attachment feature and a free position that retains only the movable attachment feature,
    wherein the latching lever comprises a latching extension configured to block withdrawal of the movable attachment feature when the latching lever is in the free position.

32. The interlocking buckle of claim 31, wherein the first and second insertion directions are substantially parallel to each other.

33. The interlocking buckle of claim 31, further comprising a user control operable to move the latching lever from the anchored position to the free position.

34. The interlocking buckle of claim 31, further comprising:
    a first ejector configured to urge the static attachment feature to withdraw from the first end; and
    a second ejector configured to urge the movable attachment feature to withdraw from the second end, wherein the second ejector operates independently of the first ejector.

35. The interlocking buckle of claim 31, further comprising a latching block coupled to the latching lever such that the latching block blocks withdrawal of the static attachment feature when the latching lever is in the anchored position.

* * * * *